(12) United States Patent
Mahdizadeh et al.

(10) Patent No.: US 8,709,303 B2
(45) Date of Patent: Apr. 29, 2014

(54) DIELECTRIC INSULATION MEDIUM

(71) Applicants: Navid Mahdizadeh, Baden (CH);
Thomas Alfred Paul, Wadenswil (CH);
Judith Kessler, Oberrohrdorf (CH);
Markus Bujotzek, Zurich (CH); Patrick Stoller, Zurich (CH); Max-Steffen Claessens, Untersiggenthal (CH); Per Skarby, Wurenlos (CH)

(72) Inventors: Navid Mahdizadeh, Baden (CH);
Thomas Alfred Paul, Wadenswil (CH);
Judith Kessler, Oberrohrdorf (CH);
Markus Bujotzek, Zurich (CH); Patrick Stoller, Zurich (CH); Max-Steffen Claessens, Untersiggenthal (CH); Per Skarby, Wurenlos (CH)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/918,491

(22) Filed: Jun. 14, 2013

(65) Prior Publication Data

US 2013/0265692 A1 Oct. 10, 2013

Related U.S. Application Data

(63) Continuation of application No. PCT/EP2011/072571, filed on Dec. 13, 2011, and a continuation of application No. PCT/EP2010/069624, filed on Dec. 14, 2010.

(30) Foreign Application Priority Data

Oct. 19, 2011 (EP) ..................................... 11185837

(51) Int. Cl.
*H01B 3/20* (2006.01)
(52) U.S. Cl.
USPC ............... 252/571; 252/573; 252/67; 252/68; 252/69

(58) Field of Classification Search
None
See application file for complete search history.

(56) References Cited

U.S. PATENT DOCUMENTS

| | | | |
|---|---|---|---|
| 3,185,734 A | 5/1965 | Fawcett et al. |
| 3,201,728 A | 8/1965 | McWhirter |
| 4,136,121 A | 1/1979 | Martini et al. |
| 4,162,227 A | 7/1979 | Cooke |
| 4,166,798 A | 9/1979 | Mastroianni et al. |
| 4,175,048 A | 11/1979 | Christophorou et al. |
| 4,288,651 A | 9/1981 | Wootton |
| 4,296,003 A | 10/1981 | Harrold et al. |
| 4,350,838 A | 9/1982 | Harrold |
| 4,440,971 A | 4/1984 | Harrold |

(Continued)

FOREIGN PATENT DOCUMENTS

| | | |
|---|---|---|
| CA | 2420574 C | 3/2002 |
| CA | 2516996 C | 9/2004 |

(Continued)

OTHER PUBLICATIONS

3M(tm) Novec(tm) 1230 Fire Protection Fluid—Brochure © 3M 2008; 6 pages.

(Continued)

*Primary Examiner* — Necholus Ogden, Jr.
(74) *Attorney, Agent, or Firm* — St. Onge Steward Johnston & Reens LLC

(57) ABSTRACT

A dielectric insulation medium including a hydrofluoro monoether, the hydrofluoro monoether containing at least three carbon atoms. The insulation medium according has high insulation capabilities, in particular a high dielectric strength, and at the same time a low GWP. The invention further includes an insulation medium which is chemically and thermally stable also at temperatures above 140° C., which is non-toxic or has a low toxicity level, and which in addition is non-corrosive and non-explosive.

62 Claims, 2 Drawing Sheets

(56) References Cited

U.S. PATENT DOCUMENTS

| | | | |
|---|---|---|---|
| 5,399,718 | A | 3/1995 | Costello et al. |
| 5,466,877 | A | 11/1995 | Moore |
| 5,730,894 | A | 3/1998 | Minor |
| 5,858,065 | A | 1/1999 | Li et al. |
| 5,998,671 | A | 12/1999 | Van Der Puy |
| 6,403,149 | B1 | 6/2002 | Parent et al. |
| 6,478,979 | B1 | 11/2002 | Rivers et al. |
| 7,074,343 | B2 | 7/2006 | Minor et al. |
| 7,128,133 | B2 * | 10/2006 | Costello et al. ............... 165/80.4 |
| 7,314,576 | B2 | 1/2008 | Minor et al. |
| 7,390,427 | B2 | 6/2008 | Costello et al. |
| 7,416,679 | B2 | 8/2008 | Minor et al. |
| 7,736,529 | B2 | 6/2010 | Luly et al. |
| 7,742,283 | B2 | 6/2010 | Hama et al. |
| 7,816,618 | B2 | 10/2010 | Uchii |
| 7,923,630 | B2 | 4/2011 | Richardson |
| 7,988,877 | B2 | 8/2011 | Flynn et al. |
| 8,080,185 | B2 | 12/2011 | Luly et al. |
| 8,245,512 | B2 | 8/2012 | Schwiegel et al. |
| 2003/0007543 | A1 | 1/2003 | Grenfell et al. |
| 2004/0056234 | A1 | 3/2004 | Belt et al. |
| 2005/0127322 | A1 | 6/2005 | Costello et al. |
| 2006/0210711 | A1 | 9/2006 | Hayashi et al. |
| 2008/0135817 | A1 | 6/2008 | Luly et al. |
| 2009/0109604 | A1 | 4/2009 | Yanabu et al. |
| 2011/0232870 | A1 | 9/2011 | Flynn et al. |
| 2012/0085735 | A1 | 4/2012 | Uchii et al. |
| 2012/0145521 | A1 | 6/2012 | Glasmacher |

FOREIGN PATENT DOCUMENTS

| | | |
|---|---|---|
| CN | 101197221 A | 6/2008 |
| DE | 548450 C | 6/1934 |
| DE | 641963 C | 2/1937 |
| DE | 3215234 A1 | 10/1983 |
| DE | 19519301 A1 | 11/1996 |
| DE | 202009009305 U1 | 11/2009 |
| DE | 102009025204 C5 | 1/2013 |
| EP | 0131922 A1 | 1/1985 |
| EP | 0545430 A1 | 6/1993 |
| EP | 0670294 A2 | 9/1995 |
| EP | 1146522 A1 | 10/2001 |
| EP | 1261398 B1 | 12/2002 |
| EP | 1498941 A2 | 1/2005 |
| EP | 1764487 A1 | 3/2007 |
| EP | 1933432 A1 | 6/2008 |
| EP | 2525454 A2 | 11/2012 |
| FR | 2930019 A1 | 10/2009 |
| FR | 2955970 A1 | 8/2011 |
| GB | 753375 A | 7/1956 |
| GB | 1194431 A | 6/1970 |
| JP | 8306549 A | 11/1996 |
| JP | 2738997 B2 | 4/1998 |
| JP | 2879848 B1 | 4/1999 |
| JP | 11286679 A | 10/1999 |
| JP | 2000059935 A | 2/2000 |
| JP | 2005126480 A | 5/2005 |
| JP | 2007300716 A | 11/2007 |
| JP | 2010131584 A | 6/2010 |
| JP | 2010171173 A | 8/2010 |
| KR | 20070080895 A | 8/2007 |
| RU | 2276164 C2 | 5/2006 |
| WO | 0024814 A1 | 5/2000 |
| WO | 0105468 A2 | 1/2001 |
| WO | 0250173 A2 | 6/2002 |
| WO | 02086191 A1 | 10/2002 |
| WO | 02086192 A1 | 10/2002 |
| WO | 02103319 A1 | 12/2002 |
| WO | 03022981 A1 | 3/2003 |
| WO | 2004090177 A1 | 10/2004 |
| WO | 2007013169 A1 | 2/2007 |
| WO | 2007075804 A1 | 7/2007 |
| WO | 2007136948 A2 | 11/2007 |
| WO | 2008073790 A2 | 6/2008 |
| WO | 2010142346 A1 | 12/2010 |
| WO | 2010146022 A1 | 12/2010 |
| WO | 2011019456 A1 | 2/2011 |
| WO | 2011054870 A1 | 5/2011 |
| WO | 2011090992 A1 | 7/2011 |
| WO | 2011119421 A1 | 9/2011 |
| WO | 2011119456 A1 | 9/2011 |
| WO | 2012038442 A1 | 3/2012 |
| WO | 2012038443 A1 | 3/2012 |

OTHER PUBLICATIONS

3M(tm) Flüssigkeiten für das Wärmemanagement und Elektro-/Elektronik-Testen—Brochure © 3M 2010; 8 pages.

Yamamoto et al, "Applying a Gas Mixture Containing c-C4F8 as an Insulation Medium", IEEE Transactions on Dielectrics and electrical Insulation, vol. 8 No. 6, Dec. 2001 (abstract only—2 pages).

Cartwright, et al.; "Barrow Offshore Windfarm Design & Build of UKs First OWF Sub-Station"; Vestas KBR; Oct. 2005; 26 pages.

Kynast, et al.; "Basic investigations concerning equipment with liquefied SF6 under extreme low temperatures"; Technical Colloquium; 2011; 8 pages.

Milbrath; "Development of 3MTM NovecTM 612 Magnesium Protection Fluid as a Substitute for SF6 over Molten Magnesium"; Presented at the International Conference on SF6 and the Environment, Nov. 21-22, 2002.

International Search Report & Written Opinion of the International Searching Authority Application No. PCT/EP2011/072571 Completed: Jan. 5, 2012; Mailing Date: Jan. 12, 2012 9 pages.

Smith, et al.; "Perfluoroisopropyl Ketones—The Chemistry of Carbonyl Fluoride. II. Synthesis of Perfluoroisopropyl Ketones"; Journal of the American Chemical Society (J. Am. Chem. Soc.), vol. 84, pp. 4285-4288, 1962.

Seimens Alarm Brochure—2005; 40 pages.

Abb, et al.; "Valhall Re-Development Project, Power From Shore"; Mar. 17, 2010; 5 pages.

Brand, "Dielectric Strength, Boiling Point and Toxicity of Gases—Different Aspects of the Same Basic Molecular Properties"; Oct. 1982; pp. 451-456.

3M(tm); "Fluorochemicals in Heat Transfer Applications"; Jun. 21, 2000; 2000; 27 pages.

Tuma, "Fluoroketone C2F5C(O)CF(CF3)2 as a Heat Transfer Fluid for Passive and Pumped 2-Phase Applications"; 24th IEEE Semi0Therm Symposium; 2008; 8 pages.

Christophorou, et al.; "Gases for electrical insulation and arc interruption : possible present and future alternatives to pure SF6"; NIST Technical Note 1425; Nov. 1997; 48 pages.

* cited by examiner

DIELECTRIC INSULATION MEDIUM

FIELD OF THE INVENTION

The present invention relates to a dielectric insulation medium and to the use of a hydrofluoro monoether in a dielectric insulation medium and to the use of the dielectric insulation medium for an apparatus for the generation, distribution and/or usage of electrical energy. The invention further relates to an apparatus for the generation, distribution and/or usage of electrical energy.

BACKGROUND OF THE INVENTION

Dielectric insulation media in liquid or gaseous state are conventionally used for the insulation of an electrically active part in a wide variety of electrical apparatuses, such as switchgears or transformers.

In medium or high voltage metal-encapsulated switchgears, for example, the electrically active part is arranged in a gas-tight housing, which defines an insulating space, said insulation space comprising an insulation gas usually at several bar pressure and separating the housing from the electrically active part thus preventing flow of electrical current between housing and active parts. Metal-encapsulated switchgears allow for a much more space-saving construction than switchgears which are mounted outdoors and are insulated by ambient air. For interrupting the current in a high voltage switchgear, the insulating gas further functions as an arc extinction gas.

Many of the conventionally used insulation media have several drawbacks.

On one hand, conventional insulation gases with high insulation and switching performance often have some environmental impact when released into the atmosphere. So far, the high global warming potential (GWP) of these insulation gases has been coped with by strict gas leakage control in gas-insulated apparatuses and by very careful gas handling.

On the other hand, conventional environment-friendly insulation gases, such as dry air or $CO_2$, have quite a low insulation performance, thus requiring the gas pressure and/or the insulation distances to be increased.

For the reasons mentioned above, efforts have been made in the past to replace the conventional insulation gases by suitable substitutes.

For example, WO 2008/073790 discloses a dielectric gaseous compound which—among other characteristics—has a low boiling point in the range between −20° C. to −273° C., is preferably non-ozone depleting and has a GWP of less than 22,200 on a 100 year time scale. Specifically, WO 2008/073790 discloses various different compounds which do not fall within a generic chemical definition.

Further, U.S. Pat. No. 4,175,048 relates to a gaseous insulator comprising a compound selected from the group of perfluorocyclohexene and hexafluoroazomethane, and EP-A-0670294 discloses the use of perfluoropropane as a dielectric gas.

EP-A-1933432 and co-pending US-A-2009109604 refer to trifluoroiodomethane ($CF_3I$) and its use as an insulating gas in a gas-insulated switchgear.

The use of a compound of general formula CxHyFzI in general, and of $CF_3I$ in particular, as an insulating medium for electric power transmitting and distributing machines is further disclosed in EP-A-1146522.

However, despite of the insulation properties mentioned in these documents, $CF_3I$ has a relatively low thermal stability: at around 100° C. it starts to decompose into hazardous products, including $I_2$, which can form a solid, conducting residue.

Considering the drawbacks of the insulation media that are state of the art, and in particular those of $CF_3I$, the object of the present invention is thus to provide a thermally stable dielectric insulation medium which has a low impact on the environment.

SUMMARY OF THE INVENTION

The object of the present invention is achieved by a dielectric insulation medium comprising a hydrofluoro monoether containing at least three carbon atoms. Preferred embodiments of the invention are given in the dependent claims.

The term "hydrofluoro monoether" as used in the context of the present invention, refers to a compound having one and only one ether group, said ether group linking two alkyl groups, which can be, independently from each other, linear or branched. The compound is thus in clear contrast to the compounds disclosed in U.S. Pat. No. 7,128,133, relating to the use of compounds containing two ether groups, i.e. hydrofluoro diethers, in heat-transfer fluids.

The term "hydrofluoro monoether" as used in the context of the present invention is further to be understood as a compound which is partially hydrogenated and partially fluorinated.

The term "hydrofluoro monoether" is further to be understood such that it may comprise a mixture of differently structured hydrofluoro monoethers. The term "structurally different" shall broadly encompass any difference in sum formula or structural formula of the hydrofluoro monoether.

The present invention is based on the surprising finding that by using a hydrofluoro monoether, an insulation medium is obtained that has high insulation capabilities, in particular a high dielectric strength (or breakdown field strength), and at the same time a low GWP.

Due to the use of the specific hydrofluoro monoethers, the present invention further allows to provide an insulation medium which is chemically and thermally stable to temperatures above 140° C., which is non-toxic or has a low toxicity level, and which in addition is non-corrosive and non-explosive.

As mentioned above, the hydrofluoro monoethers according to the present invention have been found to have a relatively high dielectric strength. Specifically, the ratio of the dielectric strength of the hydrofluoro monoethers according to the present invention to the dielectric strength of $SF_6$ is greater than about 0.4.

The hydrofluoro monoether according to the present invention can participate in a very efficient tropospheric removal process which involves hydrogen abstraction by an OH radical. Ultimately, this results in a relatively low atmospheric lifetime of the compound.

Due to its relatively low atmospheric lifetime, the hydrofluoro monoether of the present invention also has a relatively low GWP, as already mentioned. Specifically, an insulating medium having a GWP of less than 1,000 over 100 years, more specifically of less than 700 over 100 years, can be achieved according to the present invention.

The hydrofluoro monoether according to the present invention has a relatively low atmospheric lifetime and in addition is devoid of halogen atoms that play a role in the ozone destruction catalytic cycle, namely Cl, Br or I. Therefore, the dielectric insulation medium according to the present invention has the further advantage of zero ODP, which is very favourable from an environmental perspective.

The hydrofluoro monoether of the present invention contains at least three carbon atoms.

Hydrofluoro monoethers containing at least three carbon atoms generally have a boiling point of higher than −20° C. at ambient pressure. This is in clear contrast to the teaching of the state of the art, and in particular of WO 2008/073790 which teaches a boiling point of −20° C. or lower to be an essential feature of a feasible dielectric compound.

The preference for a hydrofluoro monoether containing at least three carbon atoms and thus having a relatively high boiling point of more than −20° C. is based on the finding that a higher boiling point of the hydrofluoro monoether generally goes along with a higher dielectric strength.

In the following some exemplary embodiments, which may be present alone or in combination, of the present invention are given.

In embodiments, the dielectric insulation medium comprises a gas component a) different from the hydrofluoro monoether, and in particular the gas component a) comprises a mixture of at least two gas component elements a1), a2), . . . an).

In embodiments, the dielectric insulation medium comprises a gas component a) having an atmospheric boiling point of at least 50 K, preferably at least 70 K, in particular at least 100 K, below an atmospheric boiling point of the hydrofluoro monoether.

In embodiments, the dielectric insulation gas component a) has a dielectric strength of more than 10 kV/(cm bar), preferably more than 20 kV/(cm bar), in particular more than 30 kV/(cm bar). In embodiments, the dielectric insulation gas component a) is a carrier gas which itself has a lower dielectric strength than the hydrofluoro monoether. In this regard, the term "dielectric strength" is to be understood as "pressure-reduced dielectric strength" or "dielectric strength at standard temperature and pressure". For example, the standard temperature is thereby defined as 25° C. and the standard pressure as 1 bar.

In embodiments, the dielectric insulation gas component a) comprises molecules with less atoms than present in the hydrofluoro monoether, in particular comprises tri-atomic and/or di-atomic molecules or consists of tri-atomic and/or di-atomic molecules.

According to an embodiment of the present invention, the hydrofluoro monoether contains 3 or 4 or 5 or 6 carbon atoms, in particular three or four carbon atoms, most preferably exactly three carbon atoms.

More particularly, the hydrofluoro monoether according to the present invention is thus at least one compound selected from the group consisting of the compounds defined by the following structural formulae in which a part of the hydrogen atoms is substituted by a fluorine atom:

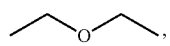 (Oa)

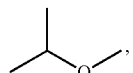 (Ob)

 (Oc)

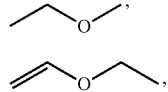 (Od)

-continued

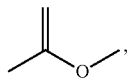 (Oe)

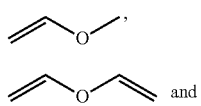 (Of)

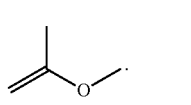 and (Og)

(Oh)

By using a hydrofluoro monoether containing three or four carbon atoms, and in specific cases also when containing five or six carbon atoms, a gaseous insulation medium can be achieved, which does not liquefy under typical operational conditions and which at the same time has a relatively high dielectric strength.

Furthermore, by using a hydrofluoro monoether containing three or four or five or six carbon atoms, an insulating medium can be achieved, which is non-explosive and thus complies even with high safety requirements.

In summary, by using a hydrofluoro monoether containing three or four carbon atoms a non-explosive dielectric insulation medium having a high dielectric strength relative to air and having at the same time a boiling point of less than 30° C. can be achieved. This is of particular relevance for the targeted use of the insulation medium in an electrical apparatus, such as for example gas-insulated switchgear, a gas-insulated transmission line or a gas-insulated substation. By using a hydrofluoro monoether containing five or six carbon atoms non-explosivity and high dielectric strength together with a boiling point of less than 55° C. or less than 40° C. are achievable.

In the context of the present invention, the term "boiling point" is to be understood as boiling point at atmospheric pressure, i.e. at about 1 bar.

Considering flammability of the compounds, it is further preferred that the ratio of the number of fluorine atoms to the total number of fluorine and hydrogen atoms, here briefly called "F-rate", of the hydrofluoro monoether is at least 5:8. It has been found that compounds falling within this definition are generally non-flammable and thus result in an insulation medium complying with highest safety requirements.

According to a further preferred embodiment, the ratio of the number of fluorine atoms to the number of carbon atoms, here briefly called "F/C-ratio", ranges from 1.5:1 to 2:1. Such compounds generally have a GWP of less than 1,000 over 100 years, thus leading to a very environment-friendly insulation medium. It is particularly preferred that the hydrofluoro monoether has a GWP of less than 700 over 100 years.

In embodiments, the dielectric insulation medium as a whole has a global warming potential GWP over 100 years of less than 1000, preferably less than 700, preferably less than 300, preferably less than 100, preferably less than 50, preferably less than 20, most preferred less than 10.

Regarding the environmental aspect, it is further preferred that the hydrofluoro monoether also has an ODP of 0, as mentioned above.

The above mentioned desirable effects can in particular be achieved by a hydrofluoro monoether having the general structure (I)

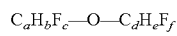

$$C_aH_bF_c-O-C_dH_eF_f \qquad (I)$$

wherein a and d independently are an integer from 1 to 3 with a+d=3 or 4 or 5 or 6, in particular 3 or 4, b and c independently are an integer from 0 to 11, in particular 0 to 7, with b+c=2a+1, and e and f independently are an integer from 0 to 11, in particular 0 to 7, with e+f=2d+1, with further at least one of b and e being 1 or greater and at least one of c and f being 1 or greater.

It is thereby a preferred embodiment that in the general structure or formula (I) of the hydrofluoro monoether:
a is 1, b and c independently are an integer ranging from 0 to 3 with b+c=3, d=2, e and f independently are an integer ranging from 0 to 5 with b+c=5, with further at least one of b and e being 1 or greater and at least one of c and f being 1 or greater.

According to a particularly preferred embodiment, exactly one of c and f in the general structure (I) is 0. The corresponding grouping of fluorines on one side of the ether linkage, with the other side remaining unsubstituted, is called "segregation". Segregation has been found to reduce the boiling point compared to unsegregated compounds of the same chain length. This feature is thus of particular interest for the dielectric insulation medium, because compounds with longer chain lengths allowing for higher dielectric strength can be used without risk of liquefaction under operational conditions.

Most preferably, the hydrofluoro monoether according to the present invention is selected from the group consisting of pentafluoro-ethyl-methyl ether ($CH_3$—O—$CF_2CF_3$) and 2,2,2-trifluoroethyl-trifluoromethyl ether ($CF_3$—O—$CH_2CF_3$).

Pentafluoro-ethyl-methyl ether has a boiling point of +5.25° C. and a GWP of 697 over 100 years, the F-rate being 0.625, while 2,2,2-trifluoroethyl-trifluoromethyl ether has a boiling point of +11° C. and a GWP of 487 over 100 years, the F-rate being 0.75. They both have an ODP of 0 and are thus environmentally fully acceptable.

In addition, pentafluoro-ethyl-methyl ether has been found to be thermally stable at a temperature of 175° C. for 30 days and therefore to be fully suitable for the operational conditions given in electrical insulation applications. Since thermal stability studies of hydrofluoro monoethers of higher molecular weight have shown that the stability of ethers containing fully hydrogenated methyl or ethyl groups have a lower thermal stability compared to those having partially hydrogenated groups, it can be assumed that the thermal stability of 2,2,2-trifluoroethyl-trifluoromethyl ether is even higher.

Hydrofluoro monoethers in general, and pentafluoro-ethyl-methyl ether as well as 2,2,2-trifluoroethyl-trifluoromethyl ether in particular, display a low risk for human toxicity. This can be concluded from the available results of mammalian HFC (hydrofluorocarbon) tests. Also, information available on commercial hydrofluoro monoethers give no evidence of carcinogenicity, mutagenicity, reproductive/developmental effect and other chronic effects of the compounds of the present application.

Based on the data available for commercial hydrofluoro ethers of higher molecular weight, it can be concluded that the hydrofluoro monoethers of the present application in general, and in particular pentafluoro-ethyl-methyl ether as well as 2,2,2-trifluoroethyl-trifluoromethyl ether, have a lethal concentration LC 50 of higher than 10,000 ppm, rendering them suitable for insulation applications also from a toxicological point of view.

The hydrofluoro monoether according to the present invention has a higher dielectric strength than air. In particular, pentafluoro-ethyl-methyl ether has a dielectric strength about 2.4 times higher than air at 1 bar, as will be shown in connection with the figures below.

Given its boiling point, which is preferably below 55° C., more preferably below 40° C., in particular below 30° C., the hydrofluoro monoether according to the present invention, particularly pentafluoro-ethyl-methyl ether and 2,2,2-trifluoroethyl-trifluoromethyl ether, respectively, is normally in the gaseous state at operational conditions, as is required for many applications, and in particular for high voltage switching in gas insulated switchgears (GIS).

The dielectric insulation medium of this application can be a gas mixture, which apart from the hydrofluoro monoether preferably comprises air and/or at least one air component, in particular selected from the group consisting of carbon dioxide ($CO_2$), oxygen ($O_2$) and nitrogen ($N_2$), and/or a noble gas, and/or nitric oxide (NO), and/or nitrogen dioxide ($NO_2$), and/or nitrous oxide ($N_2O$) as buffer or carrier gas. Alternatively, the dielectric insulation medium can substantially consist of hydrofluoro monoether.

By using a suitable admixture gas, a further increase in the dielectric strength of the insulation medium can be achieved.

In the case of pentafluoro-ethyl-methyl ether, for example, a dielectric strength of 68 kV/cm at 1 bar total pressure can be achieved by adding a small amount of admixture gas (which has a higher boiling point than pentafluoro-ethyl-methyl ether and a dielectric strength higher than $SF_6$). The dielectric strength obtained thereby is higher than that of $SF_6$ at the same pressure (84 kV/cm), as will be shown in the context of the figures below.

According to a preferred embodiment, suitable admixture gases are selected from the group consisting of fluoroketones containing from 4 to 15 carbon atoms, preferably from 4 to 12 carbon atoms, more preferably from 4 to 10 carbon atoms, even more preferably from 4 to 8 carbon atoms, even further more preferably from 5 to 8 carbon atoms, and most preferably is a fluoroketone containing exactly 5 and/or exactly 6 and/or exactly 7 and/or exactly 8 carbon atoms. According to a particularly preferred embodiment, dodecafluoro-2-methylpentan-3-one and/or decafluoro-2-methylbutan-3-one, is used as an admixture gas, as it has been found to have very high insulating properties and an extremely low GWP. A dielectric insulation medium comprising such fluoroketones has been disclosed in the previously filed PCT/EP2009/057294 of the same applicant, the total content of which is herewith enclosed in this application by reference.

The term "fluoroketone" as used herein shall be interpreted broadly and shall encompass both perfluoro-ketones and hydrofluoroketones. The term shall also encompass both saturated compounds and unsaturated compounds including double and/or triple bonds. The at least partially fluorinated alkyl chain of the fluoroketones can be linear or branched.

The term "fluoroketone" shall also encompass fluoroketones having a cyclic carbon backbone. The term "fluoroketone" shall signify a chemical composition that comprises a carbonyl-group and on each side of it an alkyl-group. The term "fluoroketone" may comprise additional in-chain hetero-atoms (i.e. hetero-atoms attached to the chemical structure comprising a carbonyl-group and on each side of it an alkyl-group), e.g. may comprise at least one hetero-atom being part of the carbon backbone and/or being attached to the carbon backbone. In exemplary embodiments, the fluoroketone shall have no hetero-atom.

The term "fluoroketone" shall also encompass fluoro-diketones having two carbonyl-groups or fluoroketones having more than two carbonyl-groups. In exemplary embodiments, the fluoroketone shall be fluoromonoketones.

In exemplary embodiments, the fluoroketone is a perfluoroketone, and/or the fluoroketone has a branched alkyl chain, in particular an at least partially fluorinated alkyl chain, and/ or the fluoroketone contains fully saturated compounds. The expression that "the fluoroketone contains fully saturated compounds" means that both a single fully saturated fluoroketone, i.e. a fluoroketone without any double bond or triple bond, or a mixture of two or more fully saturated fluoroketones may be comprised.

In an embodiment, the fluoroketone is or comprises at least one compound selected from the group consisting of the compounds defined by the following structural formulae in which at least one hydrogen atom is substituted with a fluorine atom:

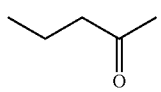
(Ia)

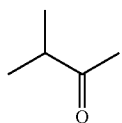
(Ib)

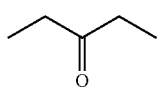
(Ic)

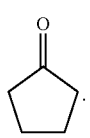
(Id)

In embodiments, the fluoroketone is or comprises a perfluoroketone, in particular has the molecular formula $C_5F_{10}O$, i.e. is fully saturated without double or triple bonds. The fluoroketone may more preferably be selected from the group consisting of 1,1,1,3,4,4,4-heptafluoro-3-(trifluoromethyl)butan-2-one (also named decafluoro-3-methylbutan-2-one), 1,1,1,3,3,4,4,5,5,5-decafluoropentan-2-one, 1,1,1,2,2,4,4,5,5,5-decafluoropentan-3-one, 1,1,1,4,4,5,5,5,-octafluoro-3-bis(trifluoromethyl)-pentan-2-one; and most preferably is 1,1,1,3,4,4,4-heptafluoro-3-(trifluoromethyl)butan-2-one.

In embodiments, the further fluoroketone is or comprises at least one compound selected from the group consisting of the compounds defined by the following structural formulae in which at least one hydrogen atom is substituted with a fluorine atom:

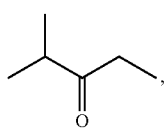
(IIa)

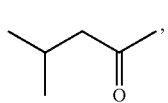
(IIb)

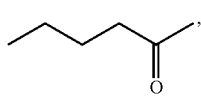
(IIc)

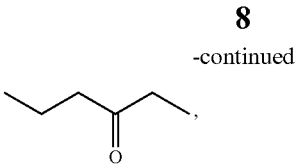
(IId)

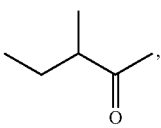
(IIe)

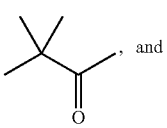
(IIf)

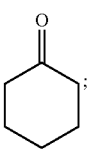
(IIg)

and/or is or comprises at least one compound selected from the group consisting of the compounds defined by the following structural formulae in which at least one hydrogen atom is substituted with a fluorine atom:

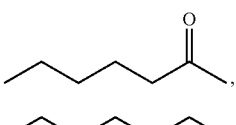
(IIIa)

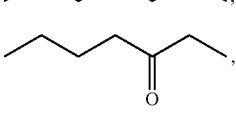
(IIIb)

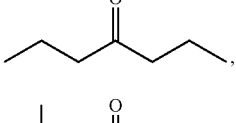
(IIIc)

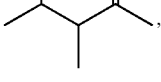
(IIId)

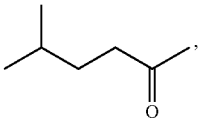
(IIIe)

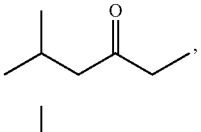
(IIIf)

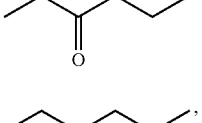
(IIIg)

(IIIh)

-continued

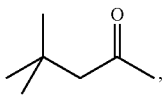
(IIIi)

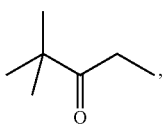
(IIIj)

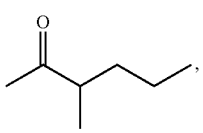
(IIIk)

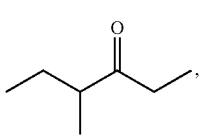
(IIIl)

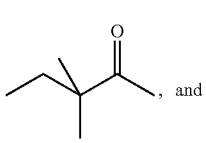
, and
(IIIm)

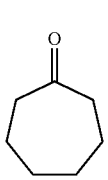
(IIIn)

named dodecafluoro-cycloheptanone.

In embodiments, the fluoroketone has the molecular formula $C_6F_{12}O$, i.e. is fully saturated without double or triple bonds. More preferably, the fluoroketone can be selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,3,4,4,4-heptafluoro-3-bis-(trifluoromethyl)butan-2-one (also named dodecafluoro-3,3-(dimethyl)butan-2-one), dodecafluorohexan-2-one and dodecafluorohexan-3-one, and particularly is the mentioned 1,1,1,2,4,4,5,5,5-nonafluoro-2-(trifluoromethyl)pentan-3-one.

Apart from the above gaseous embodiments, it is however also possible that the insulation medium or at least one of its components is in liquid form under certain operational conditions or even permanently. Here, "liquid form" shall be understood broadly to encompass any state of matter or mixture which comprises at least partially a liquid in any form, for example a liquid phase, an aerosol phase, an over-saturated vapour phase or combinations thereof. Such liquid form of the insulation medium or at least one of its components might for example be present for applications in a low temperature environment. In particular, the insulation medium can be a two-phase system comprising the hydrofluoro monoether both in liquid and gaseous state. More particularly, the insulation medium can be an aerosol comprising droplets of the hydrofluoro monoether dispersed in a gas phase comprising hydrofluoro monoether in the gaseous state.

The insulation properties of the insulation gas, and in particular its breakdown field strength, can be controlled by the temperature, pressure and/or composition of the system. If a two-phase system comprising the hydrofluoro monoether both in liquid and gaseous phase is used, an increase of the temperature does not only result in an increase of the absolute pressure, but also in an increase of the hydrofluoro monoether's concentration in the insulation gas due to a higher vapour pressure.

It has been found that for many applications of the insulation gas, such as applications in the medium or high voltage range, a sufficient molar ratio, i.e. the molar ratio of hydrofluoro monoether to the remaining components of the medium (generally the carrier or buffer gas), and thus also a sufficient breakdown field strength can be achieved even at very low operational temperatures e.g. of down to about −30° C. or even −40° C., even without additional measures such as external heating or vaporization.

Preferably, the molar fraction of the hydrofluoro monoether in the insulation medium is larger than 1%, preferably larger than 2%, more preferred larger than 3%, in particular larger than 3.5%.

As mentioned, the insulation medium of the present invention is particularly useful for electrical applications. The present invention thus also relates to the use of the herein-described hydrofluoro monoether in a dielectric insulation medium for an apparatus for the generation, the distribution and/or the usage of electrical energy.

The present invention also encompasses the use of the dielectric insulation medium for the dielectric insulation in an apparatus for the generation, distribution and/or usage of electrical energy.

Likewise, the present invention further relates to an apparatus for the generation, the distribution and/or the usage of electrical energy, said apparatus comprising a housing defining an insulating space and an electrical active part arranged inside the insulating space. This insulating space comprises the insulation medium described above.

Also, the term "electrically active part" in this context is to be interpreted broadly including a conductor, a conductor arrangement, a switch, a conductive component, a surge arrester, and the like.

In particular, the apparatus of the present invention includes a switchgear, in particular an air-insulated or gas-insulated metal (or otherwise)-encapsulated switchgear or a hybrid (i.e. partially air-insulated and partially gas-insulated) switchgear or a medium voltage block switchgear or a ring-main-unit, or a dead tank breaker or a PASS-module (plug-and-switch module), or a part and/or component thereof, in particular a bus bar, a bushing, a cable, a gas-insulated cable, a cable joint, a current transformer, a voltage transformer, and/or a surge arrester.

Switchgears, in particular gas-insulated switchgears (GIS), are well known to a person skilled in the art. An example of a switchgear for which the present invention is particularly well suited is for example shown in EP-A-1933432, paragraphs [0011] to [0015], the disclosure of which is incorporated herewith by reference.

It is further preferred that the apparatus is a switch, in particular an earthing switch (e.g. a fast acting earthing switch), a disconnector, a combined disconnector and earthing switch, a load-break switch or a circuit breaker, in particular a medium-voltage circuit breaker, a generator circuit breaker and/or a high-voltage circuit breaker.

In another embodiment, the apparatus is a high voltage circuit breaker having a pressure-build-up chamber for providing pressurized arc-extinguishing gas, and in a switching operation the hydrofluoro monoether is decomposed in the pressure-build-up chamber and/or arcing region during an arc-extinguishing phase. Such molecular decomposition allows to further increase the number of molecules and hence the pressure which is available for extinguishing the arc. The hydrofluoro monoether is also helpful in the exhaust region of a circuit breaker, because its rather low dissociation temperature functions as a temperature barrier in the exhaust gas. In other words, thermal energy in the exhaust gas can be absorbed by dissociation of hydrofluoro monoether in the exhaust, which prevents further temperature increase in the exhaust gas above the dissociation temperature of the hydrofluoro monoether.

According to another embodiment, the apparatus can be a transformer, in particular a distribution transformer or a power transformer.

According to still other embodiments, the apparatus can also be, e.g., an electrical rotating machine, a generator, a motor, a drive, a semiconducting device, a power electronics device, and/or a component thereof.

In embodiments, the apparatus has a conventional pressure design for being filled with sulphur hexafluoride $SF_6$ and is filled with the dielectric insulation medium, in particular, the apparatus does not contain sulphur hexafluoride $SF_6$.

The invention particularly relates to a medium or high voltage apparatus. The term "medium voltage" as used herein refers to a voltage in the range of 1 kV to 72 kV, whereas the term "high voltage" refers to a voltage of more than 72 kV. Applications in the low voltage range below 1 kV are feasible, as well.

In order to achieve a desired dielectric rating of the apparatus, such as a desired dielectric withstand capability (for example represented by a desired breakdown field strength) and operating temperature range, the apparatus can comprise a control unit (also referred to as "fluid management system") for controlling individually or in combination: the composition—in particular the chemical composition or the physical phase composition, such as a gas/liquid two-phase system—and/or the temperature of the insulation medium, and/or the absolute pressure, the gas density, the partial pressure and/or the partial gas density of the insulation medium or at least one of its components, respectively. In particular, the control unit can comprise a heater and/or vaporizer in order to control the vapour pressure of the hydrofluoro monoether according to the invention, which is of particular relevance for applications in a low temperature environment. The vaporizer can e.g. be an ultrasound vaporizer, or can comprise spraying nozzles for spraying the insulation medium into the apparatus.

If a vaporizer is used, it should also comprise a dosing unit to set the concentration of the hydrofluoro monoether in the insulation medium according to needs of breakdown field strength. This will exemplarily be shown in more detail below for a medium or high voltage gas-insulated switchgear. Furthermore, the control unit may comprise a measuring unit for measuring the control parameters, such as temperature, pressures and/or composition—in particular the liquid phase level—and/or a monitoring unit for monitoring such parameters.

As mentioned, the present invention also relates to the use of a hydrofluoro monoether, as described above and elsewhere in this application, in a dielectric insulation medium for an electrical apparatus for the generation, the distribution and/or the usage of electrical energy, as also described herein.

In embodiments, the dielectric insulation medium and the apparatus comprising the dielectric insulation medium and the use of the hydrofluoro monoether as a dielectric insulation medium can comprise, in addition to the hydrofluoro monoether, at least one gas component a) or gas component element a1) selected from the first group consisting of: air; an air component, in particular nitrogen, oxygen and carbon dioxide; nitric oxide, nitrogen dioxide, nitrous oxide $N_2O$, $CF_3I$; noble gases and in particular argon; methane, sulphur hexafluoride $SF_6$; perfluorocarbons, in particular carbon tetrafluoride $CF_4$, $C_2F_6$, $C_3F_8$ or c-$C_4F_8$; fluoroketones, in particular fluoroketones containing exactly 5 or 6 or 7 or 8 carbon atoms; perfluoroethers, in particular perfluoro monoethers; and mixtures thereof. Such gas components a1) may have several advantages such as: good dielectric strength; low boiling points, in particular lower boiling points than hydrofluoro monoethers and preferably boiling points below 0° C. or below −10° C. or below −20° C. or below −30° C. or below −40° C.; thus may extend the range of operating temperatures to lower values; and may provide, in particular in the case of $SF_6$ or $CF_4$ when admixed in smaller quantities, relatively low contributions to an overall still acceptable GWP value of the gas mixture or dielectric insulation medium.

In further embodiments, the dielectric insulation medium and the apparatus comprising the dielectric insulation medium and the use of the hydrofluoro monoether as a dielectric insulation medium can comprise, in addition to the hydrofluoro monoether and optionally the above listed gas components and/or gas component elements, at least one gas component a) or gas component element a2) selected from the second group consisting of: $CHF_3$, $(C_2F_5)_2O$, $(CF_3)_2O$; further perfluorocarbons and in particular $C_2F_4$, $C_3F_6$, $C_4F_{10}$, $C_4F_6$, $C_4F_8$, $C_6F_{10}$, $C_6F_{12}$, $C_6F_{14}$, $C_6F_6$; $C_2F_5COF$, $C_5F_8O_2$, c-$C_4F_7I$, $CF_3CF(CF_3)CF(CF_3)CF_2I$, $CF_3CF_2CF_2CF_2I$, $CF_3CF_2CF_2I$, $CF_3CF_2I$, $CF_3CHFCF_2I$, $CF_3SF_5$, $CH_2F_2$, $CH_3$-c-$C_4F_6I$, $CH_3CF$ $(CF_3)CF(CF_3)CF_2I$, $CH_3CF_2CF_2I$, $CH_3CHFCF(CF_2CF_3)CF_2I$, CO; noble gases and in particular He, Kr, Ne; $N_2$, perfluorodiethyl thioether, perfluoromethyl ethyl thioether, perhalogenated organic compounds, tetradecylfluorohexane, $XeF_2$, $XeF_4$; and mixtures thereof.

According to one embodiment, the gas component a) is a bulk gas or buffer gas or carrier gas that is present in a larger mole fraction than the hydrofluoro monoether, in particular the gas component a) being present in a quantity of larger than 60%, preferably larger than 70%, more preferably larger than 80%, even more preferably larger than 90%, particularly preferred larger than 95%, even more particularly preferred larger than 97%, of the insulation medium.

According to an alternative embodiment, the gas component a), in particular $SF_6$ and/or $CF_4$, is present in a smaller mole fraction than the hydrofluoro monoether, in particular the gas component a) being present in a quantity of less than 40%, preferred less than 30%, more preferred less than 20%, even more preferred less than 10%, particularly preferred less than 5%, even more particularly preferred less than 3%, and most preferred less than 1%, of the insulation medium.

In other embodiments, for a dielectric insulation medium as described throughout this application and as claimed hereinafter, an apparatus and a use are disclosed, the apparatus and use comprising a hydrofluoro monoether optionally in a mixture with e.g. carbon dioxide and/or air and/or oxygen. A mixture of the hydrofluoro monoether with carbon dioxide and/or air and/or oxygen is most preferably used as an arc-extinguishing gas in a circuit breaker, in particular in a high-voltage circuit breaker or medium-voltage circuit breaker. The use of oxygen in combination with hydrofluoro monoether reduces carbon deposition on electrodes of the circuit breaker, and/or reduces the amount of toxic arcing by-products in the circuit breaker, in particular after switching operations. The use of carbon dioxide increases the arc extinction capability of the mixture.

According to a particular embodiment, the present invention does not relate to the use of a hydrofluoro monoether as a foam-blowing agent, for example for the production of polyurethane thermally insulating foams or for the generation of cellular structures in other polymers, plastics or metals used as thermal insulating materials.

According to further embodiments, the present invention does not relate to the use of a hydrofluoro monoether as a refrigerant in liquid form, as a coolant for electronic equipment or as a medium in heat transfer systems.

According to further embodiments, the present invention does not relate to the use of a hydrofluoro monoether as cleaning solvent, for example for electronic components, precision cleaning of medical or analytical equipment, or for metal finishing.

According to further embodiments, the present invention does not relate to the use of a hydrofluoro monoether as carrier solvent for coatings, lubricants or friction-reduction agents, e.g. on devices such as surgical knife blades.

According to a further embodiment, the present invention does not relate to the use of a hydrofluoro monoether for precision drying in semiconductor applications.

BRIEF DESCRIPTION OF THE DRAWINGS

The invention is further illustrated by way of the following illustrative figures of which

DETAILED DESCRIPTION OF THE INVENTION

Throughout this application, the terms "preferable", "preferred", "more preferable", "in particular" shall solely mean "exemplary" and shall therefore signify embodiments or examples only, i.e. are to be understood as optional only. The term "characterized in" is no admission of prior art.

Figure 1:
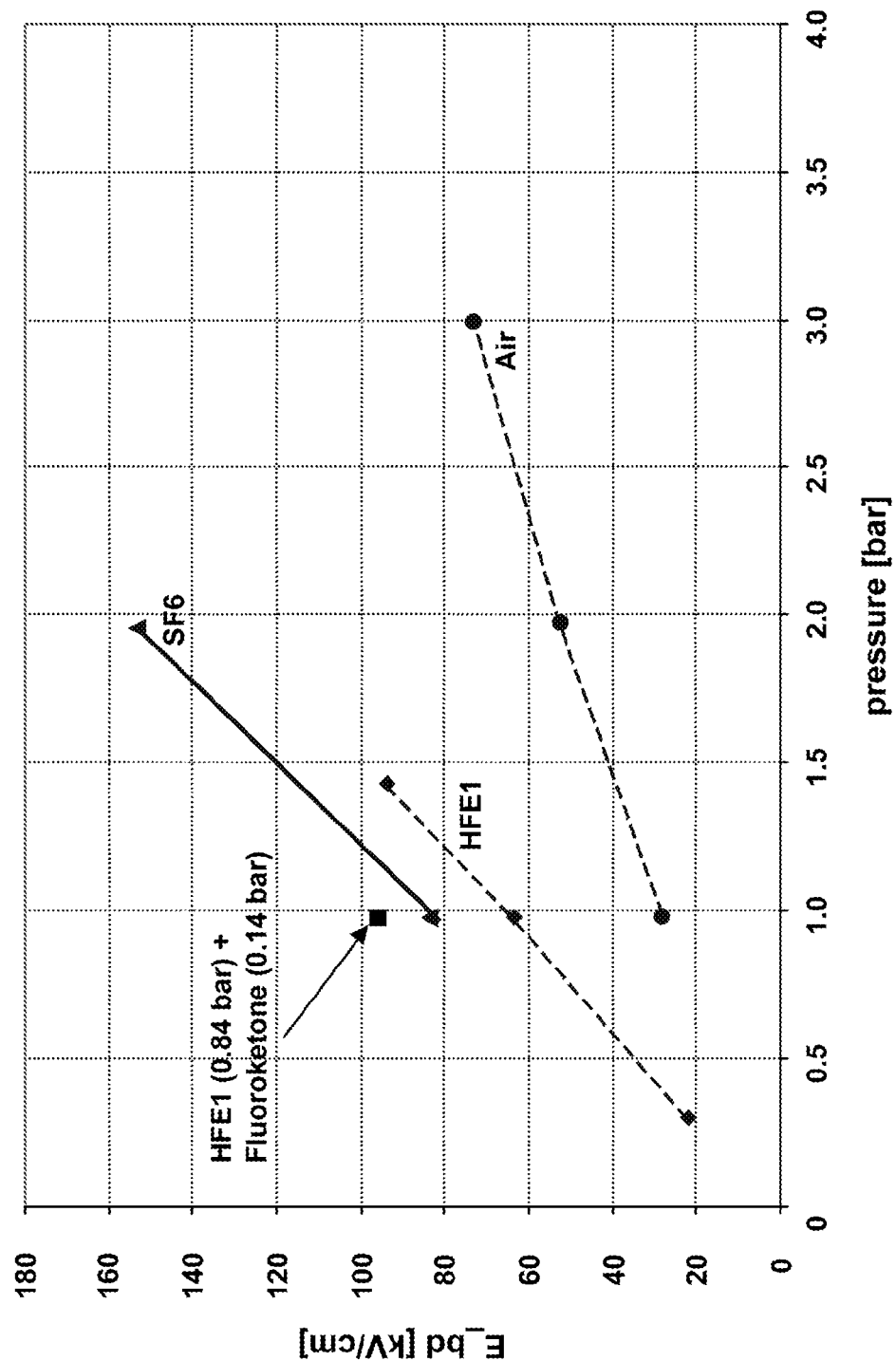
FIG. 1 shows a graphical representation of the electric breakdown field strengths of embodiments of the dielectric insulation medium of the present invention as a function of gas pressure, compared with conventional reference gases.

FIG. 1 shows the breakdown voltage or electric breakdown field strength E_bd in kV/cm of an insulation medium essentially consisting of pentafluoro-ethyl-methyl ether, here briefly called HFE1, over a given pressure range. As is apparent from FIG. 1, the breakdown voltage is higher than the one determined for pure air (shown in circles) at the respective pressure. By admixing dodecafluoro-2-methylpentan-3-one as an admixture gas having a partial pressure of 0.14 bar to pentafluoro-ethyl-methyl ether having a partial pressure of 0.84 bar, an insulation medium is obtained which has a breakdown voltage (shown by the square) that is even superior to the breakdown voltage obtained with $SF_6$ (shown in triangles) at the respective pressure of 0.98 bar.

In order to adapt the pressure and/or the composition and/or the temperature of the insulating medium in the system, the electrical apparatus can comprise a control unit (or "fluid management system"), as mentioned above. This is of particular relevance for low temperature applications down to −30° C. or even −40° C.

Figure 2:
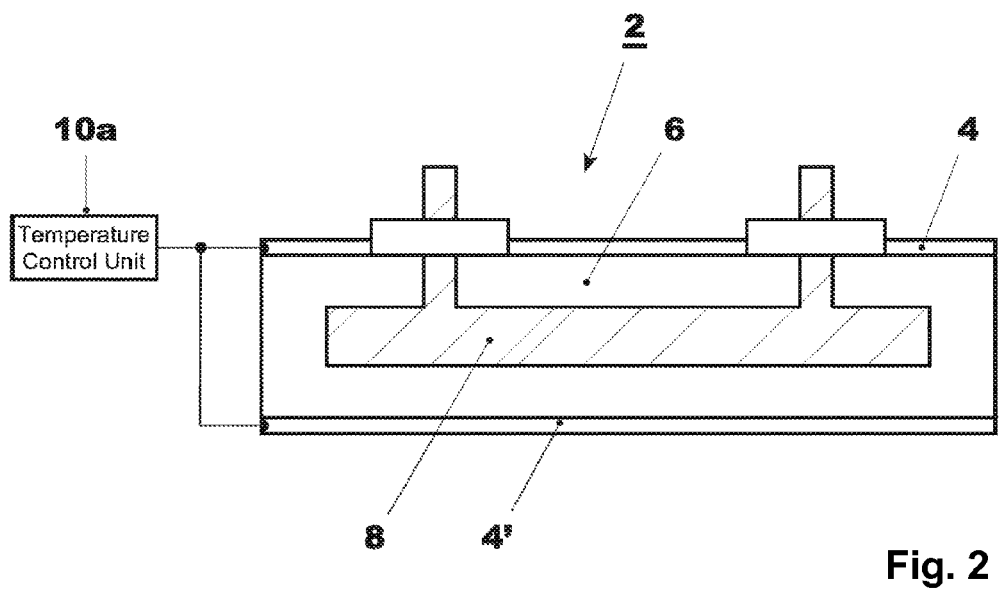
FIG. 2 shows a purely schematic representation of a medium or high voltage gas-insulated switchgear according to an embodiment of the present invention comprising a temperature control unit.

As an example, a high voltage switchgear comprising a temperature control unit is shown in FIG. 2. The switchgear 2 comprises a housing 4 defining an insulating space 6 and an electrically active part 8 arranged in the insulating space 6. The switchgear 2 further comprises a temperature control unit 10a for setting the housing 4, or at least a part of the housing 4, of the switchgear and thus the insulation medium comprised in the insulating space 6 to a desired temperature. As well, any other part in contact with the insulation medium can be heated in order to bring the insulation medium or at least parts of it to the desired temperature. Thus, the vapour pressure of the hydrofluoro monoether—and consequently its molar ratio in the insulation gas—as well as the absolute pressure of the insulation gas can be adapted accordingly. As also shown in FIG. 2, the hydrofluoro monoether is in this embodiment not homogenously distributed throughout the insulating space due to the temperature gradient given in the insulation space.

Figure 3:
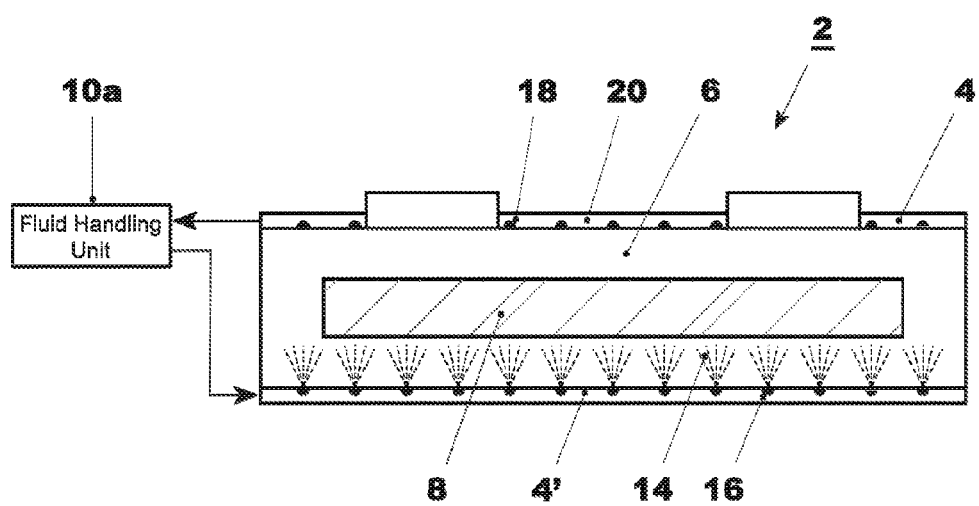
FIG. 3 shows a purely schematic representation of a medium or high voltage gas-insulated switchgear according to an embodiment of the present invention comprising a fluid handling unit.

An alternative control unit or fluid management system is schematically shown in FIG. 3 in which a fluid handling unit 10b is attributed to the gas-insulated switchgear as the control unit. According to this control unit, the composition of the dielectric insulation medium, and in particular the concentration of the hydrofluoro monoether, is adjusted in a dosing unit (not separately shown) comprised in the fluid handling unit 10b, and the resulting insulation medium is injected or introduced, in particular sprayed, into the insulating space 6. In the embodiment shown in FIG. 3, the insulation medium is sprayed into the insulating space in the form of an aerosol 14 in which small droplets of liquid hydrofluoro monoether are dispersed in the respective carrier gas. The aerosol 14 is sprayed into the insulating space 6 by means of nozzles 16 and the hydrofluoro monoether is readily evaporated, thus resulting in an insulating space 6 with an inhomogeneous concentration of hydrofluoro monoether, specifically a relatively high concentration in close proximity of the housing wall 4' comprising the nozzles 16. Alternatively, the insulation medium, in particular a concentration, pressure and/or temperature of the insulation medium or of at least one of its components, in particular the hydrofluoro monoether, can be controlled in the fluid handling unit 10b before being injected into the insulation space. In order to ensure circulation of the gas, further openings 18 are provided in the upper wall of the housing 4, said openings leading to a channel 20 in the housing 4 and allowing the insulating medium to be removed from the insulating space 6. The switchgear 2 with fluid handling unit 10b, as shown in FIG. 3, can be combined with the temperature control unit 10a described in connection with FIG. 2. If no temperature control unit is provided, condensation of the hydrofluoro monoether can occur in a low temperature environment. The condensed hydrofluoro monoether can be collected and reintroduced into the circulation of the insulation medium.

Furthermore, the apparatus 2 can have a reserve volume of hydrofluoro monoether and/or of an admixture gas, such as a fluoroketone containing from 4 to 12 carbon atoms and, in particular, from 5 to 6 carbon atoms, and/or means for limiting a maximal permissible operating temperature of the desired insulation medium such that the absolute filling pressure is maintained below a given pressure limit of the apparatus 2.

In the context of the switchgears exemplarily shown in FIG. 2 and FIG. 3 it is noted that nominal current load generally facilitates the vaporization of the hydrofluoro monoether by the ohmic heating of current carrying conductors.

In embodiments, the apparatus 2 has a dielectric insulation medium, in which the hydrofluoro monoether is present in an amount such that a condensation temperature of the hydrofluoro monoether is below +5° C., preferably below −5° C., more preferably below −20° C., even more preferably below −30° C., most preferably below −40° C.

In further embodiments, the apparatus 2 has a dielectric insulation medium, which comprises gaseous components in molar volumes such that a condensation temperature of the mixture of the gaseous components is below +5° C., preferably below −5° C., more preferably below −20° C., even more preferably below −30° C., most preferably below −40° C.

For sake of clarity: boiling point or boiling point temperature relates to the vapour pressure curve of a component of the insulation medium as a function of temperature, and in particular to the boiling point (temperature) at atmospheric pressure, i.e. at about 1 bar. This is a property of the component as such and describes its vaporization and liquefaction behaviour in particular under atmospheric surrounding pressure conditions.

In contrast, condensation temperature relates to a specific apparatus providing a volume for receiving the dielectric insulation medium, its filling with a specific dielectric insulation medium, in particular the type and amount of the component or components of the dielectric insulation medium, at a given temperature, e.g. the operating temperature or the minimal rated operating temperature, and to the corresponding total pressure of the dielectric insulation medium and the partial pressures of its components. In such a specific apparatus environment filled with a specific choice of dielectric insulation medium, condensation temperature defines the temperature at which a gaseous part or phase of the dielectric insulation medium, in particular a group of components in gaseous phase of the dielectric insulation medium, start to condense into droplets that sit down on inner surfaces of the apparatus and form a liquid "sea" thereon. Such condensation may occur at a common condensation temperature, briefly called condensation temperature, of components of the dielectric insulation medium, even if the boiling points of such components in their pure form may differ by e.g. several 10 K or even by some 50 K. As a result of different boiling points and common condensation temperature, the molar fractions of the components in the gaseous phase and in the liquid phase may vary when condensation starts.

Therefore, the term "condensation temperature" is an integral parameter describing the specific apparatus having a specific filling with the dielectric insulation medium and under specific operating conditions.

In other words, the condensation temperature is determined solely by the nature and number density or molar volume (m³/mol) of the dielectric insulation gas component or components under consideration. The number density or molar volume corresponds to the partial pressures present in the apparatus at a given temperature. Thus, the parameters "type of dielectric gas component or gas components" and "number density or molar volumes" determine at what temperature a gas or group of gas components will condense.

In embodiments, it is intended to avoid condensation by the choice of the dielectric insulation medium, in particular choice of its types and amounts of components, and by the choice of pressures, i.e. partial pressures of the components and the total pressure, possibly by additional filling of a carrier gas or bulk gas, and by the choice of operating conditions, such as temperature. The avoidance of condensation is expressed by the fact that the condensation temperature shall be lower than a minimal operating temperature or a rated operating temperature of the apparatus, e.g. lower than +5° C., or −5° C., or −20° C., or −30° C., or −40° C., as stated above.

The term carrier gas or bulk gas or buffer gas, which may be or may be comprised in the above mentioned gas component a) or gas component elements a1), a2), . . . an) different from the hydrofluoro monoether, shall signify a gaseous part of the dielectric insulation medium that contributes to the dielectric strength, but typically has a dielectric strength weaker than the (dielectrically more active or stronger) gas components, such as hydrofluoro monoether(s) and/or fluoroketone(s) and/or other "dielectrically strong" gas component species. Such carrier gas, e.g. air, typically has a condensation temperature well below the condensation temperature of the above mentioned dielectrically stronger gas components, such as hydrofluoro monoether(s) and/or fluoroketone(s).

In embodiments, the dielectric insulation medium is a dielectric insulation gas under over-pressure of less than 8 bar, preferably less than 7.5 bar, more preferably less than 7 bar, in particular equal or less than 6.5 bar; or the dielectric insulation medium is a dielectric insulation gas under over-pressure of less than 2.5 bar, preferably less than 2.0 bar, more preferably less than 1.5 bar, in particular equal to or less than 1.2 bar.

Throughout this application, the constituents of the dielectric insulation medium, such as e.g. various kinds of hydrofluoro monoethers, fluoroketones and carrier gases, are herewith explicitly disclosed to be possible or to be present in any combinations, may it be pair-wise combinations, triplet-wise combinations, quadruplet-wise combinations, or the like. Therefore, any listings of all such combinations are herewith made part of the disclosure. Furthermore, throughout this application, any disclosure of and claim on the dielectric insulation medium comprising a hydrofluoro monoether according to the present invention and any of its embodiments is also a disclosure of the use of such a hydrofluoro monoether in or as a dielectric insulation medium, and this use is explicitly disclosed herewith and may be claimed as a use claim, in particular by replacing the term "Dielectric insulation medium comprising a hydrofluoro monoether" with the term "Use of a hydrofluoro monoether in or as a dielectric insulation medium".

The invention claimed is:

1. A dielectric insulation medium comprising a hydrofluoro monoether, characterized in that the hydrofluoro monoether contains at least three carbon atoms.

2. The dielectric insulation medium according claim 1, the hydrofluoro monoether comprising a mixture of differently structured hydrofluoro monoethers.

3. The dielectric insulation medium according to claim 1, the dielectric insulation medium comprising a gas component a) different from the hydrofluoro monoether, and in particular the gas component a) comprising a mixture of at least two gas component elements a1), a2), . . . an).

4. The dielectric insulation medium according to claim 1, wherein the hydrofluoro monoether contains three or four carbon atoms.

5. The dielectric insulation medium according to claim 1, wherein the hydrofluoro monoether has a boiling point higher than −20° C.

6. The dielectric insulation medium according to claim 1, wherein the hydrofluoro monoether has a boiling point lower than 55° C.

7. The dielectric insulation medium according to claim 1, wherein the ratio of the number of fluorine atoms to the total number of fluorine and hydrogen atoms of the hydrofluoro monoether is at least 5:8.

8. The dielectric insulation medium according to claim 1, wherein the ratio of the number of fluorine atoms to the number of carbon atoms of the hydrofluoro monoether ranges from 1.5:1 to 2:1.

9. The dielectric insulation medium according to claim 1, wherein the hydrofluoro monoether has a global warming potential of less than 1,000 over 100 years.

10. The dielectric insulation medium according to claim 1, the dielectric insulation medium: having a global warming potential GWP over 100 years of less than 1000.

11. The dielectric insulation medium according to claim 1, wherein the hydrofluoro monoether has an ozone depletion potential of 0.

12. The dielectric insulation medium according to claim 1, wherein the hydrofluoro monoether has the general structure

$$C_aH_bF_c\text{—}O\text{—}C_dH_eF_f \qquad (I)$$

wherein a and d independently are an integer from 1 to 3 with a+d=3 or 4 or 5 or 6, b and c independently are an integer from 0 to 11, with b+c=2a+1, and e and f independently are an integer from 0 to 11, with e+f=2d+1, with further at least one of b and e being 1 or greater and at least one of c and f being 1 or greater.

13. The dielectric insulation medium according to claim 12, wherein in the general structure (I) of the hydrofluoro monoether a is 1, b and c independently are an integer ranging from 0 to 3 with b+c=3, d is 2, e and f independently are an integer ranging from 0 to 5 with e+f=5, with further at least one of b and e being 1 or greater and at least one of c and f being 1 or greater.

14. The dielectric insulation medium according to claim 12, wherein in the general structure (I) exactly one of c and f is 0.

15. The dielectric insulation medium according to claim 1, the hydrofluoro monoether being selected from the group consisting of pentafluoro-ethyl-methyl ether and/or 2,2,2-trifluoroethyl-trifluoromethyl ether.

16. The dielectric insulation medium according to claim 1, further comprising an admixture gas, in particular a fluoroketone containing from 4 to 15 carbon atoms.

17. The dielectric insulation medium according to claim 16, the admixture gas comprising at least one fluoroketone, which is a perfluoroketone and/or has a branched alkyl chain and/or is a fully saturated compound.

18. The dielectric insulation medium according to claim 16, the admixture gas comprising a fluoroketone having the molecular formula $C_5F_{10}O$ or $C_6F_{12}O$ and being selected from the group consisting of 1,1,1,3,4,4,4-heptafluoro-3-(trifluoromethyl)butan-2-one, 1,1,1,3,3,4,4,5,5,5-decafluoropentan-2-one, 1,1,1,2,2,4,4,5,5,5-decafluoropentan-3-one, and 1,1,1,4,4,5,5,5,-octafluoro-3-bis(trifluoromethyl)-pentan-2-one; 1,1,1,2,4,4,5,5,5-nonafluoro-2-(trifluoromethyl) pentan-3-one (also named dodecafluoro-2-methylpentan-3-one), 1,1,1,3,3,4,5,5,5-nonafluoro-4-(trifluoromethyl) pentan-2-one (also named dodecafluoro-4-methylpentan-2-one), 1,1,1,3,4,4,5,5,5-nonafluoro-3-(trifluoromethyl) pentan-2-one (also named dodecafluoro-3-methylpentan-2-one), 1,1,1,3,4,4,4-heptafluoro, 3-bis-(trifluoromethyl) butan-2-one (also named dodecafluoro-3,3-(dimethyl)butan-2-one), dodecafluorohexan-2-one and dodecafluorohexan-3-one and decafluoro-cyclohexanone.

19. The dielectric insulation medium according to claim 16, the admixture gas comprising decafluoro-2-methylbutan-3-one and/or dodecafluoro-2-methylpentan-3-one.

20. The dielectric insulation medium according to claim 1, the molar fraction of the hydrofluoro monoether in the insulation medium being larger than 1%.

21. The dielectric insulation medium according to claim 1, wherein the hydrofluoro monoether is in a gaseous phase in the insulation medium under operating conditions.

22. The dielectric insulation medium according to claim 1, wherein the hydrofluoro monoether is present as aerosol in the insulation medium under operating conditions.

23. The dielectric insulation medium according to claim 1, wherein the dielectric insulation medium is a dielectric insulation gas under over-pressure of less than 8 bar; or wherein the dielectric insulation medium is a dielectric insulation gas under over-pressure of less than 2.5 bar.

24. The dielectric insulation medium according to claim 3, the dielectric insulation gas component a) being a carrier gas having a lower dielectric strength than the hydrofluoro monoether.

25. The dielectric insulation medium according to claim 3, the dielectric insulation medium comprising a gas component a) having an atmospheric boiling point of at least 50 K below an atmospheric boiling point of the hydrofluoro monoether.

26. The dielectric insulation medium according to claim 3, the dielectric insulation gas component a) being inert and/or non-toxic and/or non-flammable.

27. The dielectric insulation medium according to claim 3, the dielectric insulation gas component a) having a dielectric strength of more than 10 kV/(cm bar); and/or the dielectric insulation gas component a) being a carrier gas which itself has a lower dielectric strength than the hydrofluoro monoether.

28. The dielectric insulation medium according to claim 3, the dielectric insulation gas component a) being air or an air component, in particular being selected from the group consisting of nitrogen, oxygen and carbon dioxide, and/or a noble gas.

29. The dielectric insulation medium according to claim 3, the dielectric insulation gas component a) comprising molecules with less atoms than present in the hydrofluoro monoether, in particular comprising tri-atomic and/or di-atomic molecules or consisting of tri-atomic and/or di-atomic molecules.

30. The dielectric insulation medium according to claim 3, comprising the hydrofluoro monoether in a mixture with at least one gas component a) or gas component element a1) selected from a first group consisting of: nitric oxide NO, nitrogen dioxide $NO_2$, nitrous oxide $N_2O$, $CF_3I$, argon, methane, sulphur hexafluoride $SF_6$; perfluorocarbons, in particular carbon tetrafluoride $CF_4$, $C_2F_6$, $C_3F_8$ or $c\text{-}C_4F_8$; perfluoroethers and in particular perfluoro monoethers; and mixtures thereof.

31. The dielectric insulation medium according to claim 3, comprising the hydrofluoro monoether in a mixture with at least one gas component a) or gas component element a2) selected from a second group consisting of: $CHF_3$, $(C_2F_5)_2O$, $(CF_3)_2O$; further perfluorocarbons and in particular $C_2F_4$, $C_3F_6$, $C_4F_{10}$, $C_4F_6$, $C_4F_8$, $C_6F_{10}$, $C_6F_{12}$, $C_6F_{14}$, $C_6F_6$; $C_2F_5COF$, $C_5F_8O_2$, $c\text{-}C_4F_7I$, $CF_3CF(CF_3)CF(CF_3)CF_2I$, $CF_3CF_2CF_2CF_2I$, $CF_3CF_2CF_2I$, $CF_3CF_2I$, $CF_3CHFCF_2I$, $CF_3SF_5$, $CH_2F_2$, $CH_3\text{-}c\text{-}C_4F_6I$, $CH_3CF(CF_3)CF(CF_3)CF_2I$, $CH_3CF_2CF_2I$, $CH_3CHFCF(CF_2CF_3)CF_2I$, CO; noble gases and in particular He, Kr, Ne; $N_2$, perfluorodiethyl thioether, perfluoromethyl ethyl thioether, perhalogenated organic compounds, tetradecylfluorohexane, $XeF_2$, $XeF_4$; and mixtures thereof.

32. The dielectric insulation medium according to claim 3, the gas component a) being a bulk gas or buffer gas or carrier gas that is present in a larger mole fraction than the hydrofluoro monoether, in particular the gas component a) being present in a quantity of larger than 60% of the insulation medium.

33. The dielectric insulation medium according to claim 3, the gas component a), in particular $SF_6$ and/or $CF_4$, being present in a smaller mole fraction than the hydrofluoro monoether, in particular the gas component a) being present in a quantity of less than 40% of the insulation medium.

34. An apparatus for the generation, distribution and/or usage of electrical energy, said apparatus comprising a housing defining an insulating space and an electrical active part arranged in the insulating space, said insulating space comprising an insulation medium, characterized by the dielectric insulation medium according to claim 1.

35. The apparatus according to claim 34, characterized in that in the dielectric insulation medium the hydrofluoro monoether is present in an amount such that a condensation temperature of the hydrofluoro monoether is below a rated operating temperature of the apparatus, in particular below +5° C.

36. The apparatus according to claim 34, characterized in that the dielectric insulation medium comprises gaseous components in molar volumes such that a condensation temperature of the mixture of the gaseous components is below a rated operating temperature of the apparatus, in particular is below +5° C.

37. The apparatus according to claim 34, characterized in that the apparatus is a switchgear, or a dead tank breaker or a PASS-module (plug-and-switch module), or a part or component thereof.

38. The apparatus according to claim 34, characterized in that the apparatus is a switch, in particular an earthing switch, a disconnector, a combined disconnector and earthing switch, a load-break switch and/or a circuit breaker.

39. The apparatus according to claim 34, characterized in that the apparatus is a high voltage circuit breaker having a pressure-build-up chamber for providing pressurized arc-extinguishing gas, such that in a switching operation the hydrofluoro monoether is decomposed in the pressure-build-up chamber and/or arcing region during an arc-extinguishing phase.

40. The apparatus according to claim 38, characterized in that the apparatus comprises hydrofluoro monoether in a mixture with a component selected from the group consisting of carbon dioxide, air and oxygen as an arc-extinguishing gas, in particular for reducing carbon deposition on electrodes and for reducing an amount of toxic arcing by-products.

41. The apparatus according to claim 34, characterized in that the apparatus is a transformer, in particular a distribution transformer or a power transformer.

42. The apparatus according to claim 34, characterized in that the apparatus is an electrical rotating machine, a generator, a motor, a drive, a semiconducting device, a power electronics device, and/or a component thereof.

43. The apparatus according to claim 34, characterized in that it further comprises a control unit for controlling individually or in combination a composition, a temperature, an absolute pressure, a partial pressure, a gas density and/or a partial gas density of the insulating medium or of at least one of its components, respectively.

44. The apparatus according claim 43, characterized in that the control unit comprises a heater and/or vaporizer for controlling the partial pressure of the hydrofluoro monoether and, in particular, for maintaining it above a required partial pressure level.

45. The apparatus according to claim 43, characterized in that the control unit comprises a temperature control unit comprising a heating system for setting the housing, or at least a part of the housing, of the apparatus to a desired temperature, and/or the control unit comprises a fluid handling unit for setting the concentration of the dielectric insulation medium, in particular the hydrofluoro monoether in the insulation medium, and for injecting the resulting insulation medium into the apparatus.

46. The apparatus according to claim 34, characterized by the apparatus having a reserve volume of liquid hydrofluoro monoether and/or of a fluoroketone, in particular a fluoroketone containing from 4 to 12 carbon atoms, and/or means for limiting a maximal permissible operating temperature of the insulation medium such that the absolute filling pressure is maintained below a given pressure limit of the apparatus.

47. The apparatus according to claim 34, characterized in that the apparatus has a conventional pressure design for being filled with sulphur hexafluoride $SF_6$ and is instead filled with a dielectric insulation medium comprising a hydrofluoro monoether, characterized in that the hydrofluoro monoether contains at least three carbon atoms.

48. The apparatus according to claim 35, wherein the condensation temperature of the hydrofluoro monoether is below −5° C.

49. The apparatus according to claim 35, wherein the condensation temperature of the hydrofluoro monoether is below −20° C.

50. The apparatus according to claim 36, wherein the condensation temperature of the mixture of the gaseous components is below −5° C.

51. The apparatus according to claim 36, wherein the condensation temperature of the mixture of the gaseous components is below −20° C.

52. Dielectric insulation medium according to claim 1, the dielectric insulation medium having a global warming potential GWP over 100 years of less than 100.

53. Dielectric insulation medium according to claim 13, wherein in the general structure (I) exactly one of c and f is 0.

54. Dielectric insulation medium according to claim 16 wherein the fluoroketone contains exactly 5 and/or exactly 6 and/or exactly 7 and/or exactly 8 carbon atoms.

55. Dielectric insulation medium according to claim 1, the molar fraction of the hydrofluoro monoether in the insulation medium being larger than 3%.

56. Dielectric insulation medium according to claim 1, wherein the dielectric insulation medium is a dielectric insulation gas under over-pressure of less than 6.5 bar; or wherein the dielectric insulation medium is a dielectric insulation gas under over-pressure of less than 1.5 bar.

57. Dielectric insulation medium according to claim 3, the gas component a) being a bulk gas or buffer gas or carrier gas that is present in a larger mole fraction than the hydrofluoro monoether, in particular the gas component a) being present in a quantity of larger than 80% of the insulation medium.

58. Dielectric insulation medium according to claim 3, the gas component a), in particular SF6 and/or CF4, being present in a smaller mole fraction than the hydrofluoro monoether, in particular the gas component a) being present in a quantity of less than 20% of the insulation medium.

59. Apparatus for the generation, distribution and/or usage of electrical energy, said apparatus comprising a housing defining an insulating space and an electrical active part arranged in the insulating space, said insulating space comprising an insulation medium, characterized by the dielectric insulation medium according to claim 16.

60. Apparatus for the generation, distribution and/or usage of electrical energy, said apparatus comprising a housing defining an insulating space and an electrical active part arranged in the insulating space, said insulating space comprising an insulation medium, characterized by the dielectric insulation medium according to claim 27.

61. The apparatus according to claim 37, characterized in that the apparatus is an air-insulated or a gas-insulated metal-encapsulated switchgear or a hybrid switchgear or a medium voltage block switchgear or a ring-main-unit, or the apparatus is a bus bar, a bushing, a cable, a gas-insulated cable, a cable joint, a current transformer, a voltage transformer, and/or a surge arrester.

62. The apparatus according to claim 45, characterized by the apparatus having a reserve volume of liquid hydrofluoro monoether and/or of a fluoroketone, in particular a fluoroketone containing from 4 to 12 carbon atoms, and/or means for limiting a maximal permissible operating temperature of the insulation medium such that the absolute filling pressure is maintained below a given pressure limit of the apparatus.

* * * * *